INVENTOR.
ALAN F. SCHOENTHAL

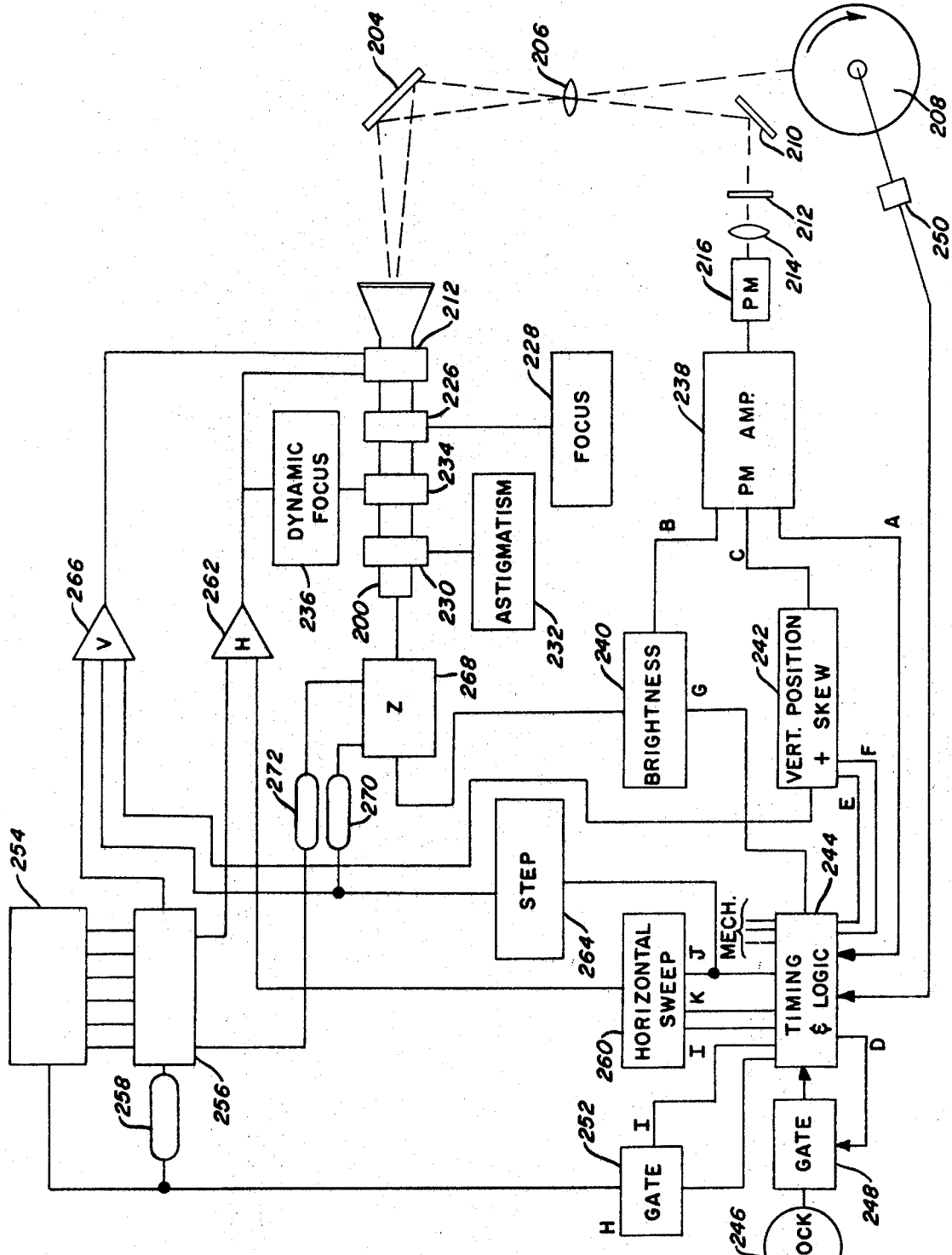

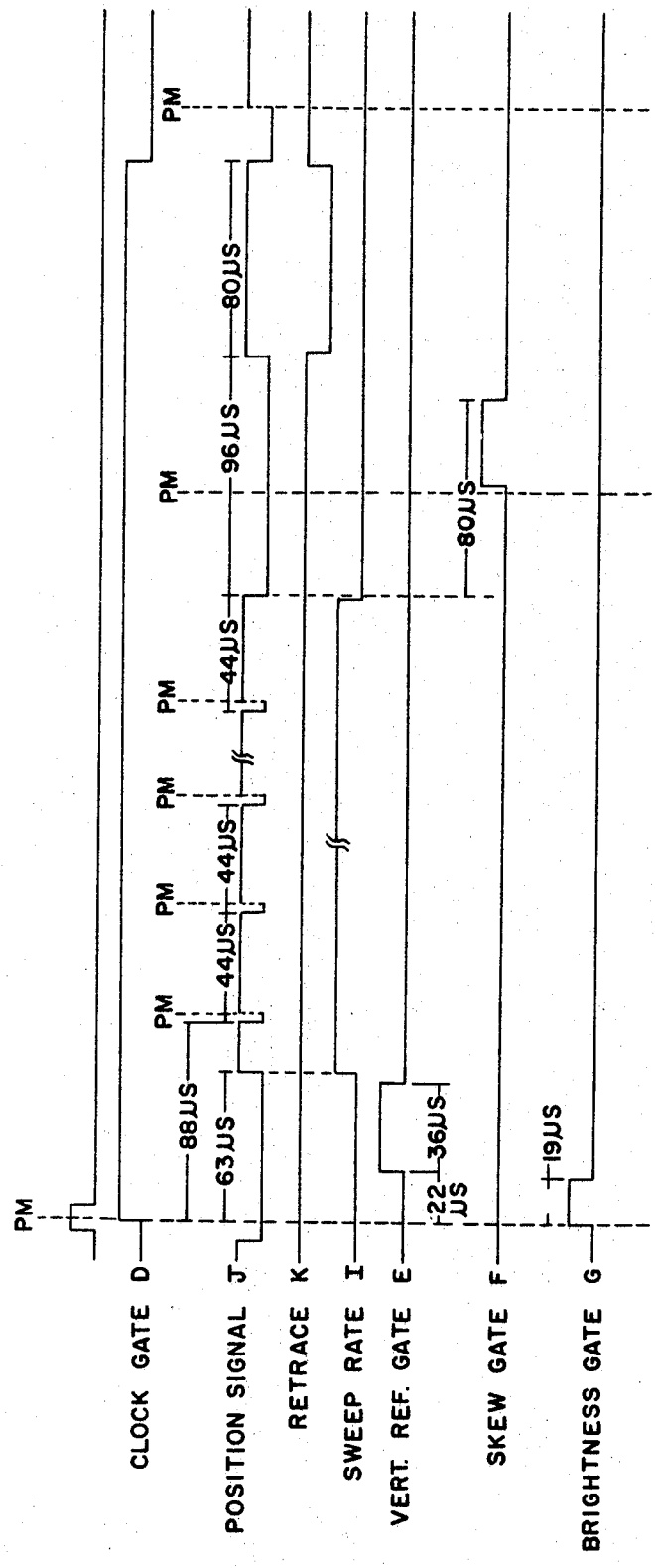
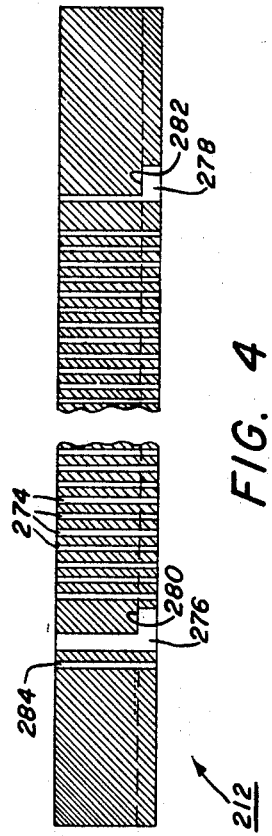

ATTORNEY

U̇nited States Patent Office 3,524,022
Patented Aug. 11, 1970

3,524,022
ELECTRO-OPTICAL DISPLAY SYSTEM
Alan F. Schoenthal, Rochester, N.Y., assignor to Xerox Corporation, Rochester, N.Y., a corporation of New York
Filed Oct. 3, 1966, Ser. No. 583,542
Int. Cl. H04l 15/34
U.S. Cl. 178—15    18 Claims

ABSTRACT OF THE DISCLOSURE

A system for accurately positioning successive characters on a cathode ray tube by referencing each character position to a corresponding slit on a stationary mask. Circuits are included whereby a single photomultiplier operating in conjunction with the stationary mask is used to control character spacing, the vertical position and alignment of each line of characters and the cathode ray tube spot brightness.

---

Figure 1:
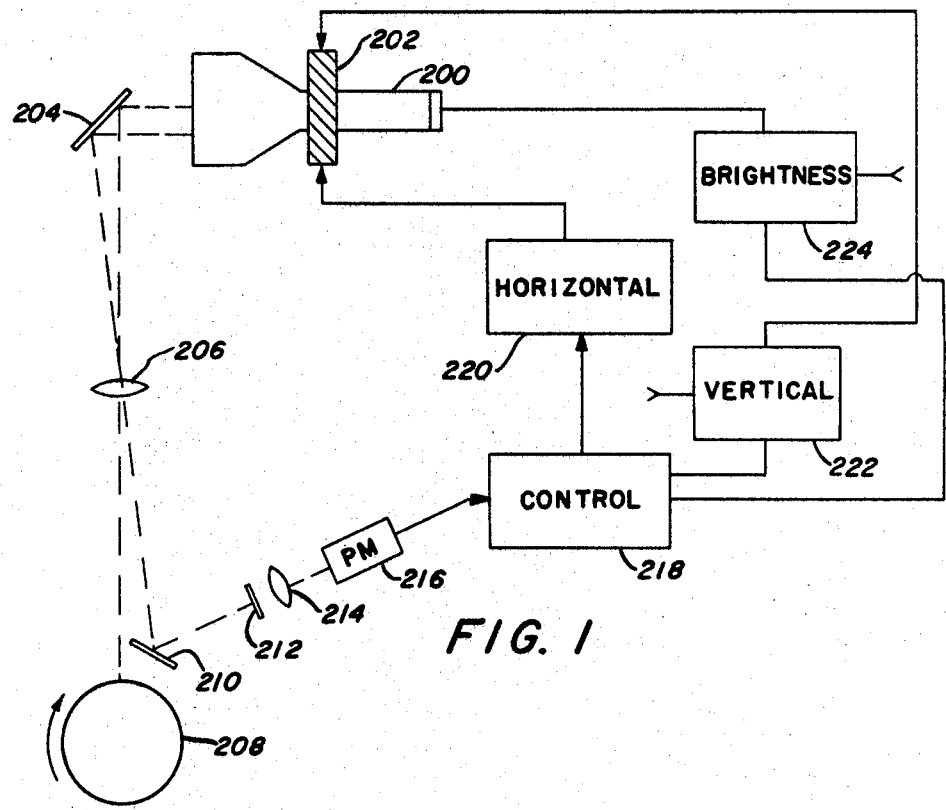

This invention relates to electro-optical display devices and, more particularly, to optical feedback means and methods for eliminating positional errors in the display.

An electro-optical character display device, as the term is used herein, referes to a device for forming a beam of light in the shape of a character and including electrically controlled beam deflection means for selectively positioning the beam of light at predetermined positions on a viewing screen or on a photosensitive member for recordation thereon. The most common example of the term is a cathode ray recorder, but the term, as well as the present invention, also applies to related devices such as those employing mirror galvanometers or piezoelectrically or magnetorestrictively driven mirrors for beam deflection or employing electro-optical effects in electrically active crystals. The characters referred to may be simply spots of light which are displayed at preselected positions, but more commonly will comprise a set of numerals, letters and symbols so that the display device may write words, numbers or some mixture thereof. Such devices are particularly useful for the writing and instantaneous display of information from a computer. With improvements in cathode ray tube technology an with an ever increasing need for greater speed in recording output information from computers and high speed telecommunication circuits, recording devices of the indicated kind are beginning to displace electromechanical printers such as teletypewrtiers or high speed line-at-a-time computer printers. This is particularly so where the information is to be recorded in a miniaturized format, for which electromechanical printers are quite unsuited. However, electro-optical display devices have suffered from a serious defect as compared to electromechanical devices. The latter characteristically print characters at accurately spaced intervals along a straight line, but this precise character alignment and positioning has been difficult to achieve with electro-optical printers. If a perfectly linear relation is established between an angle of deflection and a beam voltage, the displacement of the beam on a flat display or recording surface will vary as the tangent of the control voltage rather than as the voltage itself. Even this situation is not achieved in practice because the beam deflection angle itself is not strictly linearly related to the control voltage. Finally, the high speed electronic circuits which are required to generate the control voltages corresponding to a great many character positions tend to vary with time in an unpredictable fashion, as may the deflection system itself. A partial solution to this problem may be had by employing non-linear compensating circuits together with other highly stabilized electronic circuits. However, the required circuits are expensive and difficult to adjust and still fail to provide the ultimate in character positioning accuracy.

It is accordingly the principal object of the invention to provide an electro-optical display means and method for precise character positioning.

It is a further object to provide an electro-optical display means and method with stabilized display brightness.

It is still a further object to achieve the foregoing objects in a simple reliable and economical manner. Additional objects may be found in the description of the invention.

Generally speaking, I achieve these objects by applying electro-optical feedback in an electro-optical display device, such that the character positions are primarily determined by dimensionally stable mechanical elements, as in mechanical printers, and only secondarily by electronic circuits.

Figure 2:
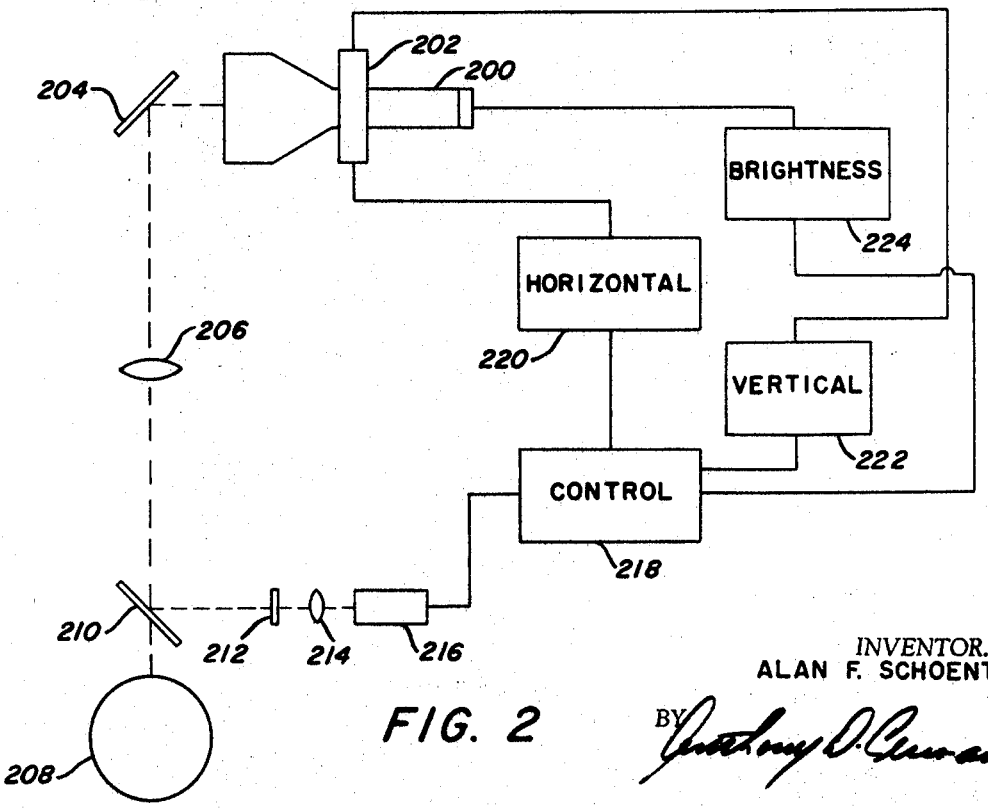
Figure 6:
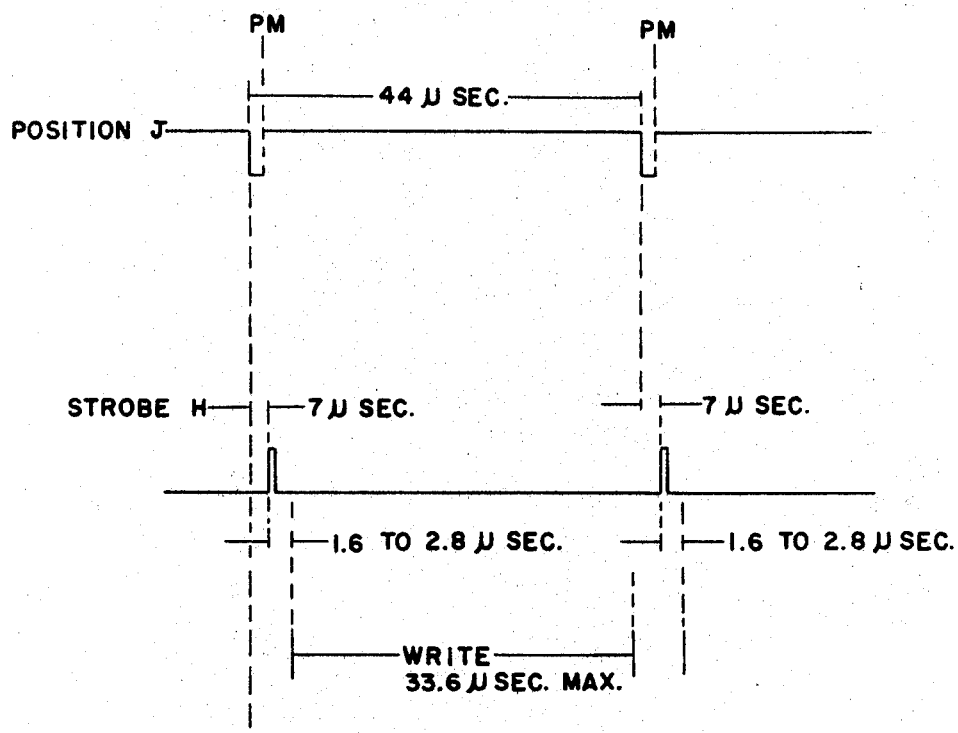
Figure 11:
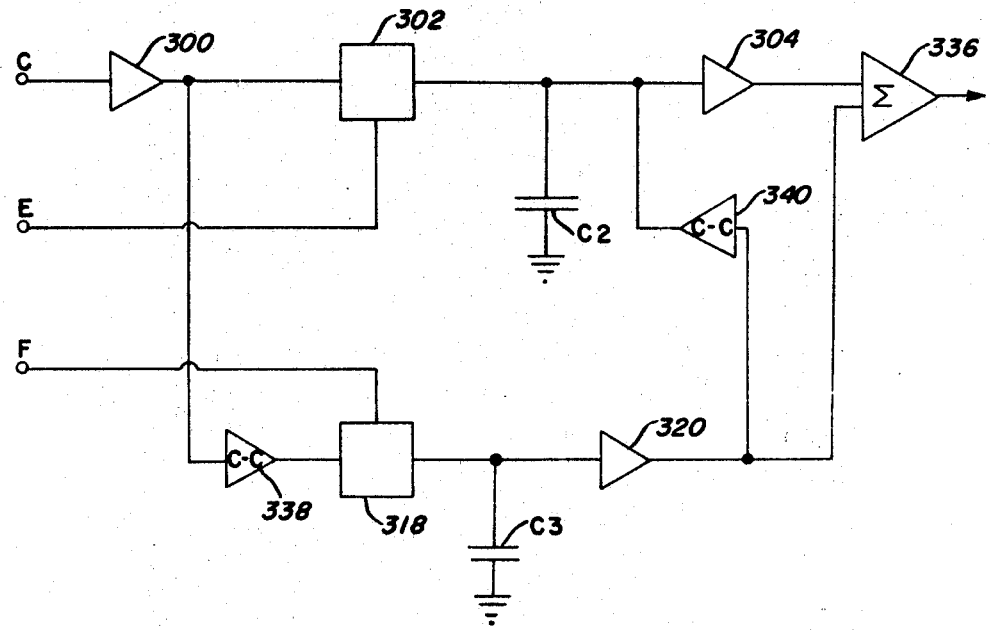
Figure 7:
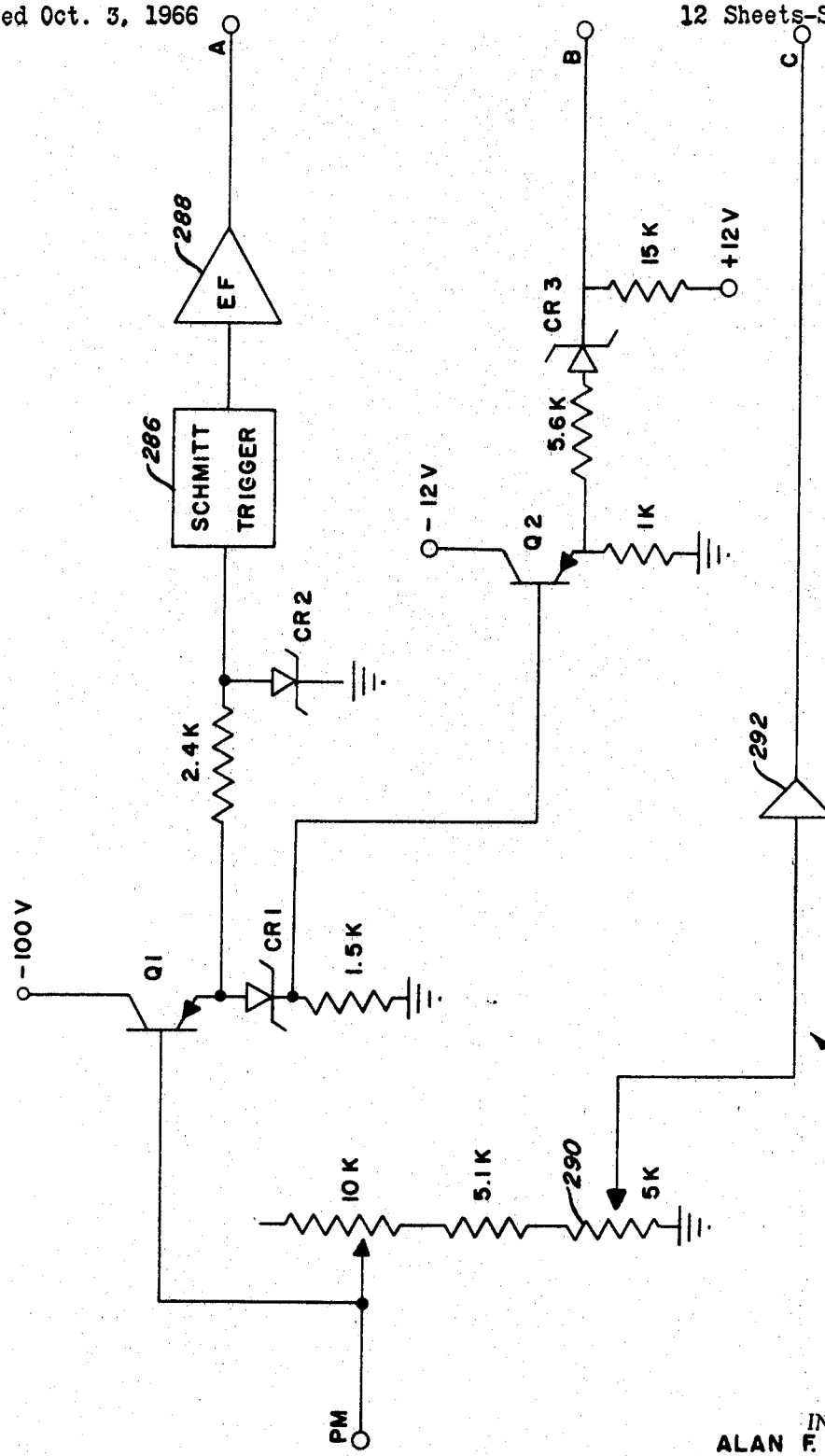
Figure 8:
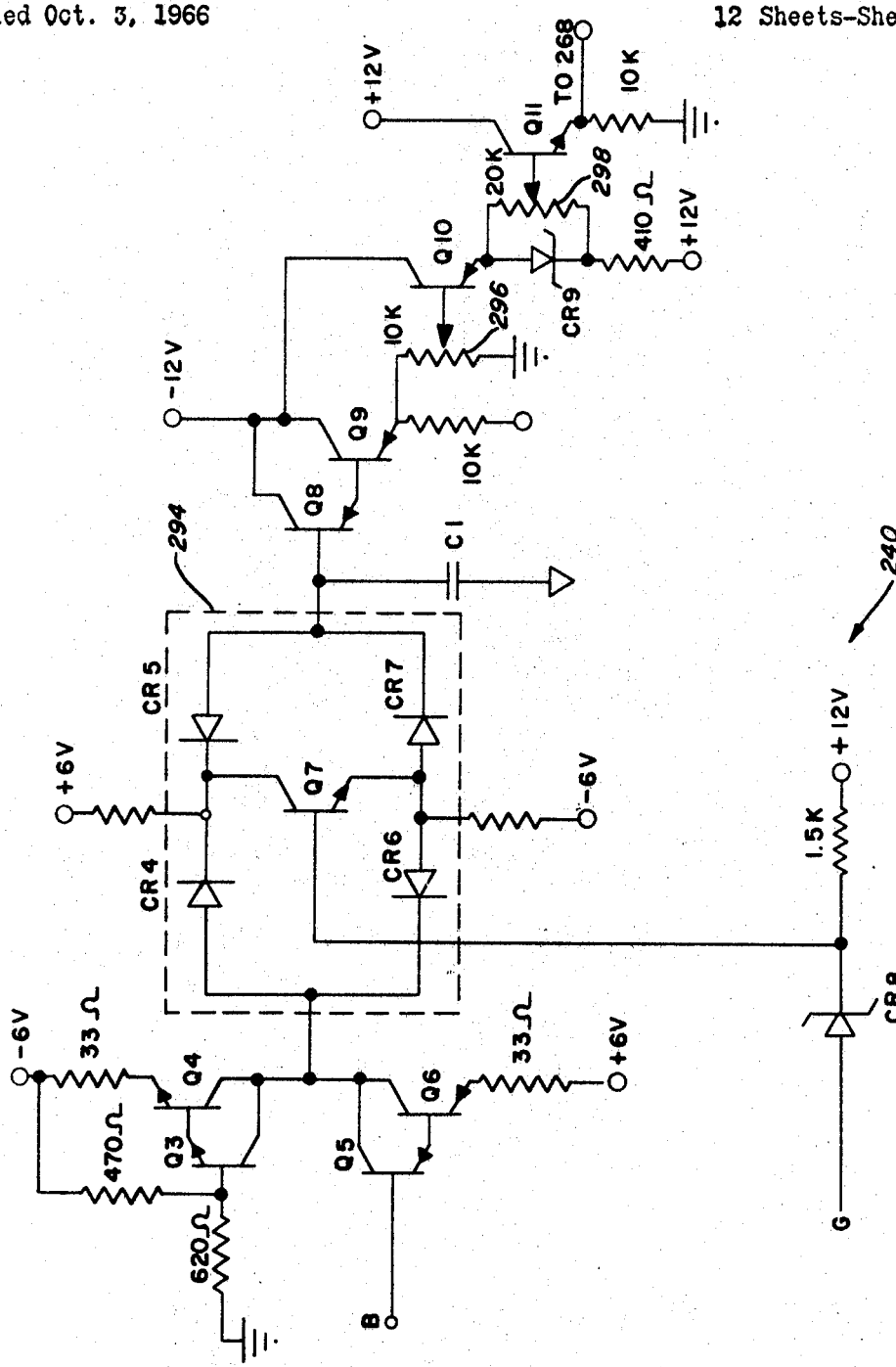
Figure 9:
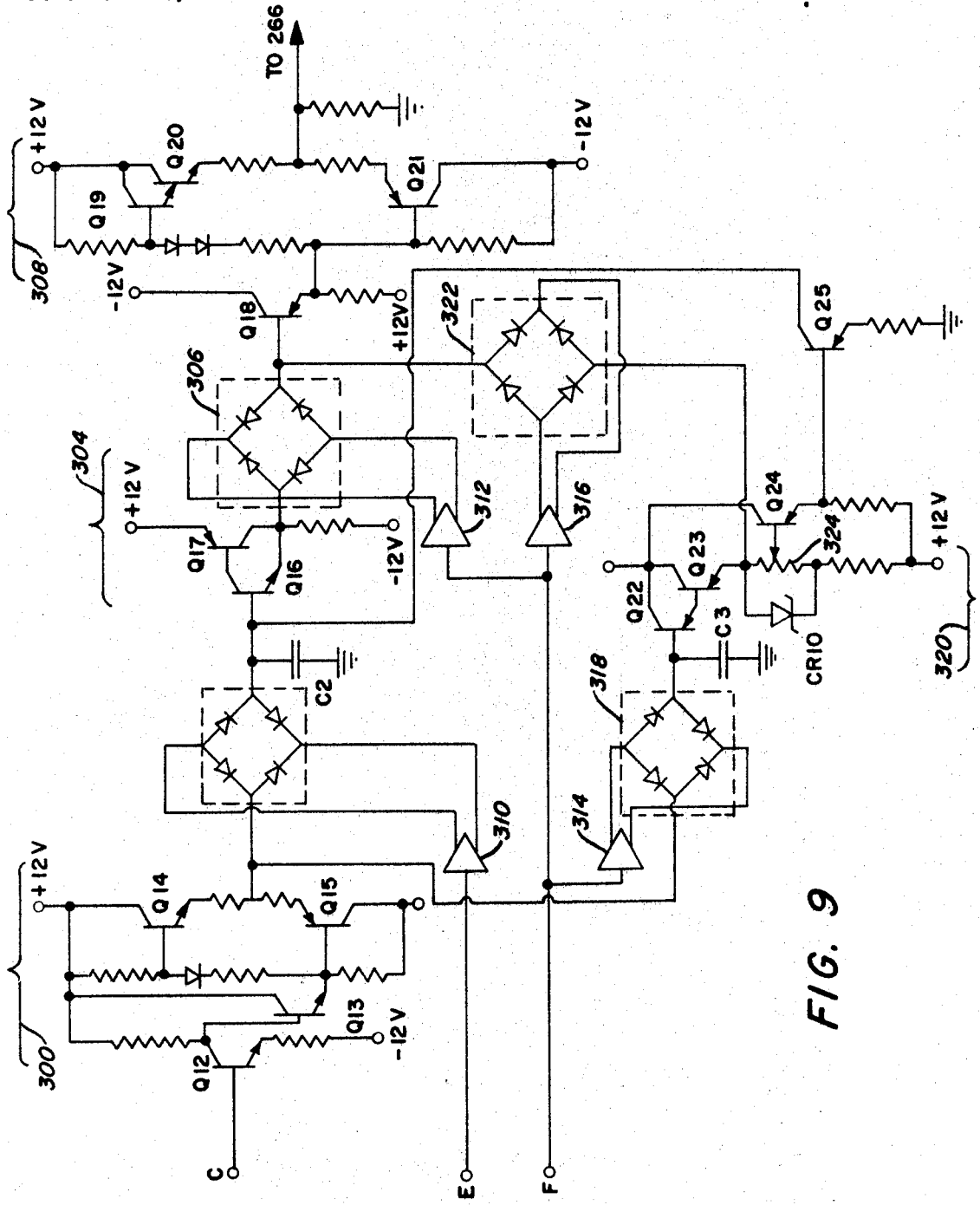
Figure 10:
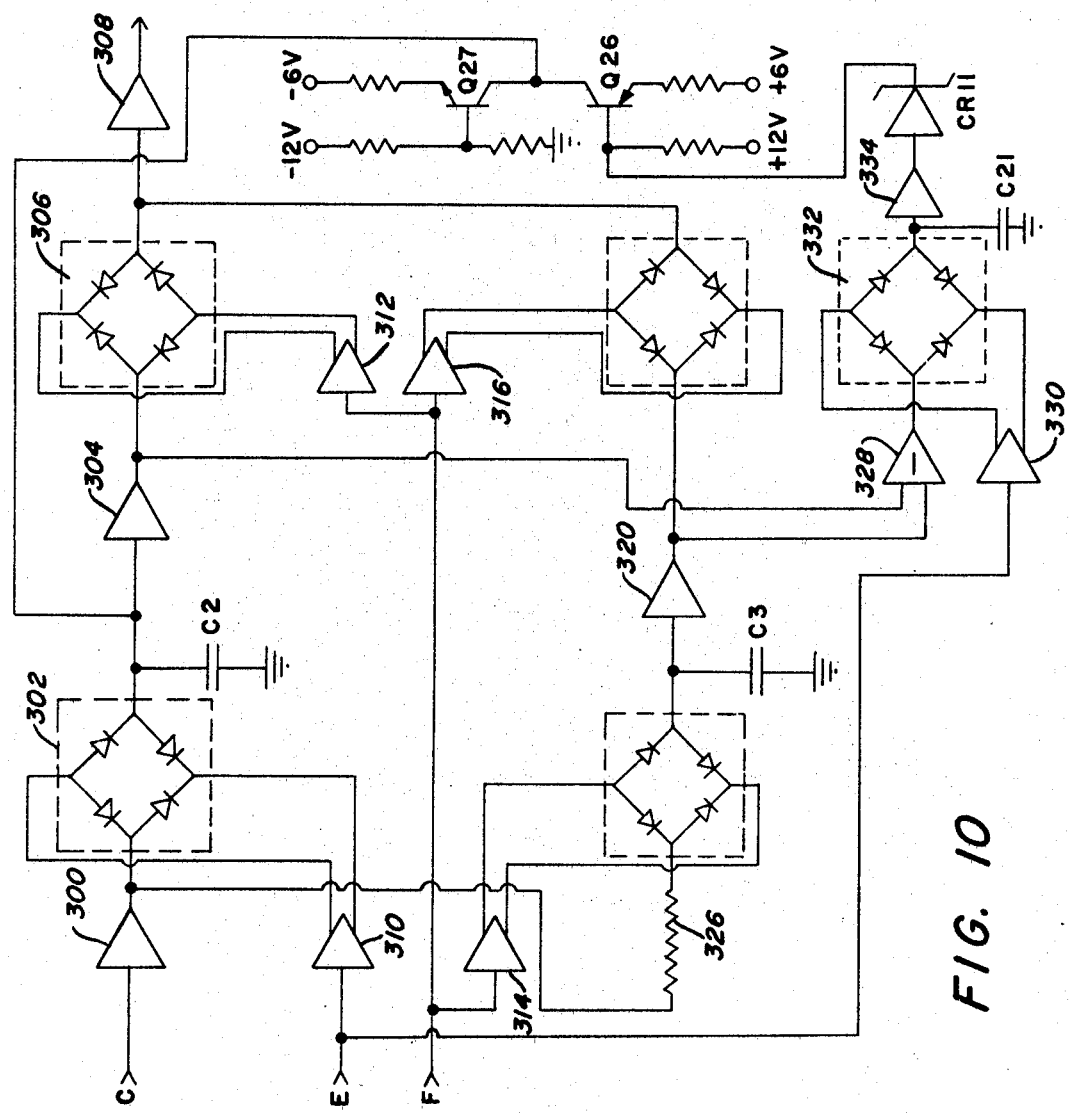
Figure 12:
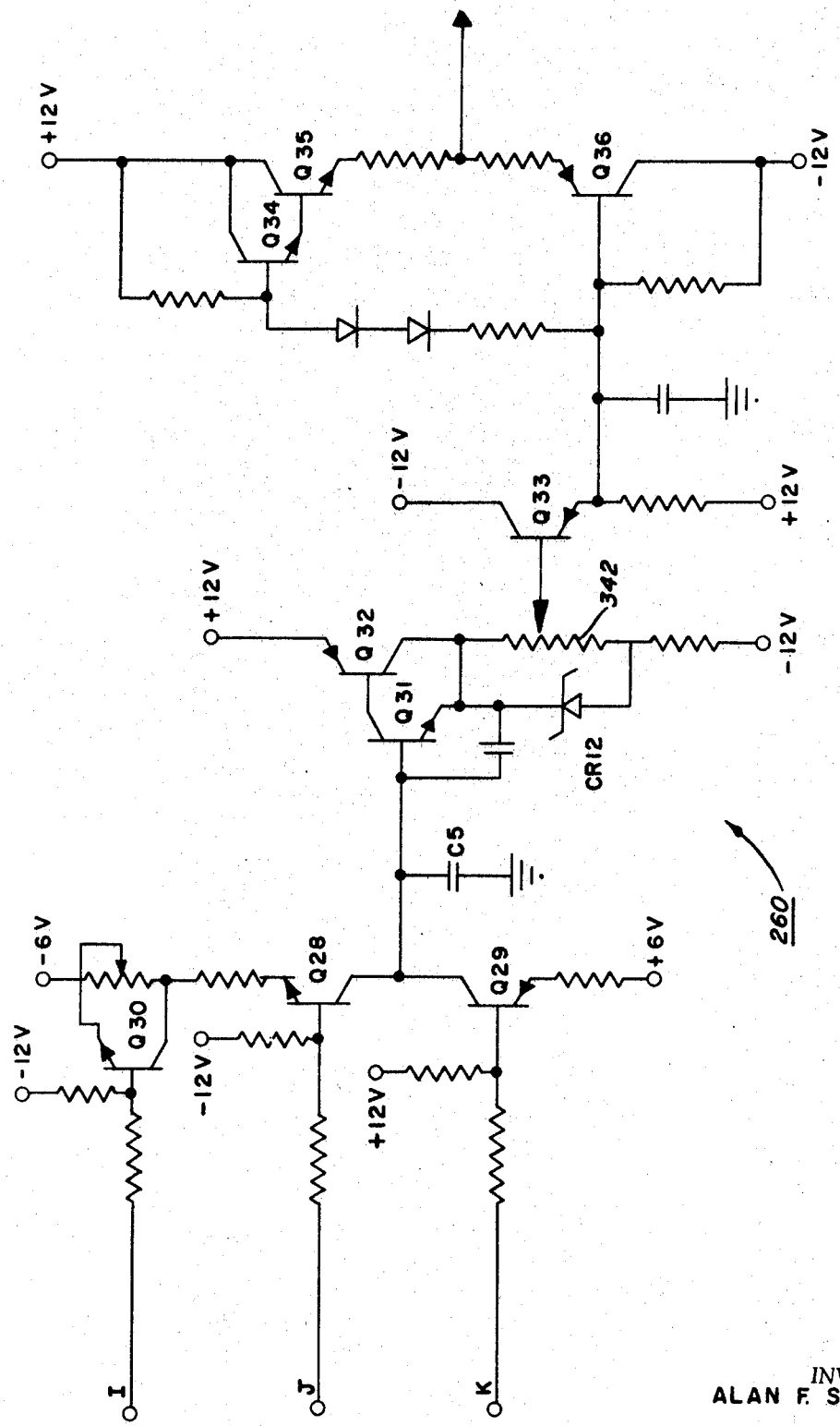
Figure 13:
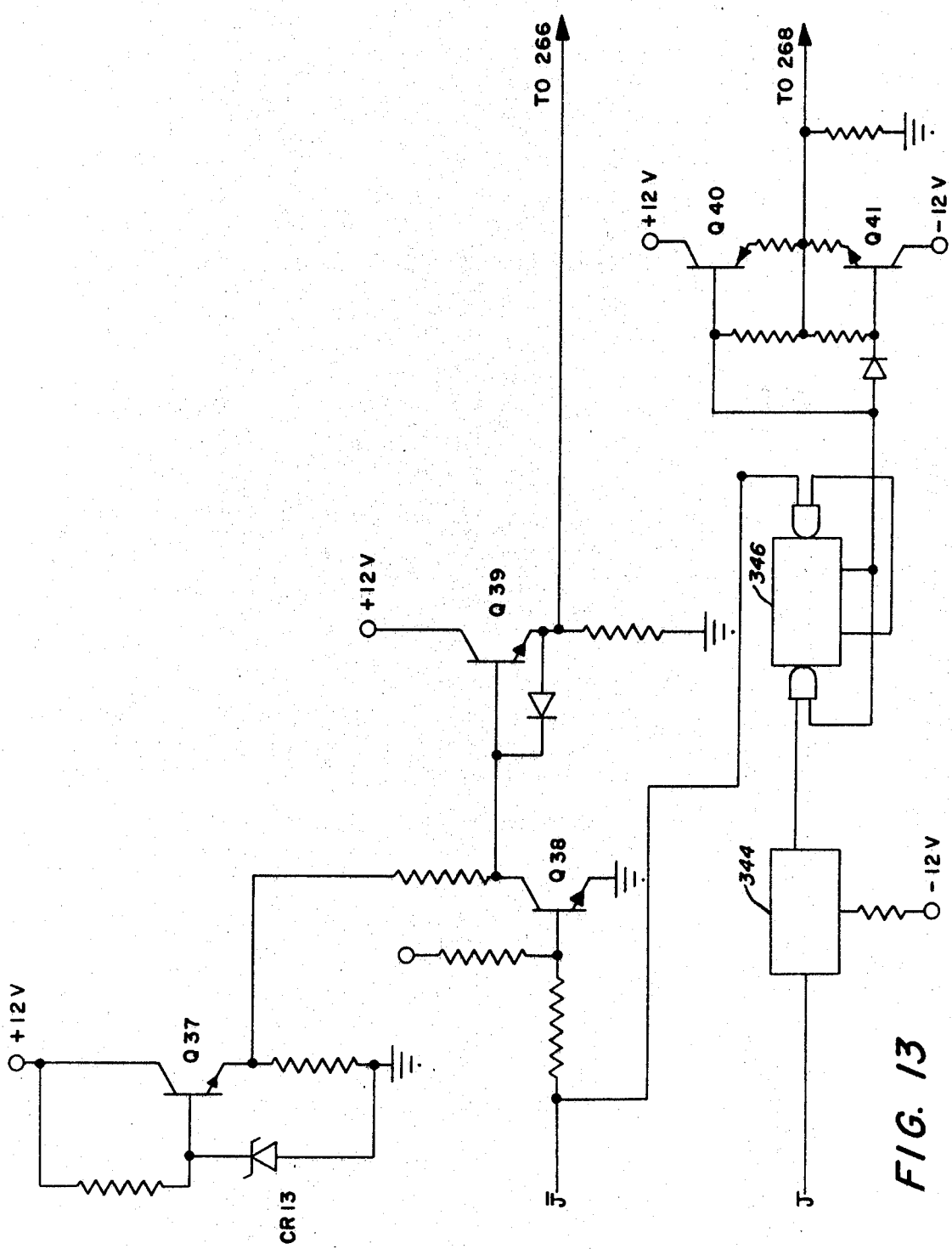
Figure 14:
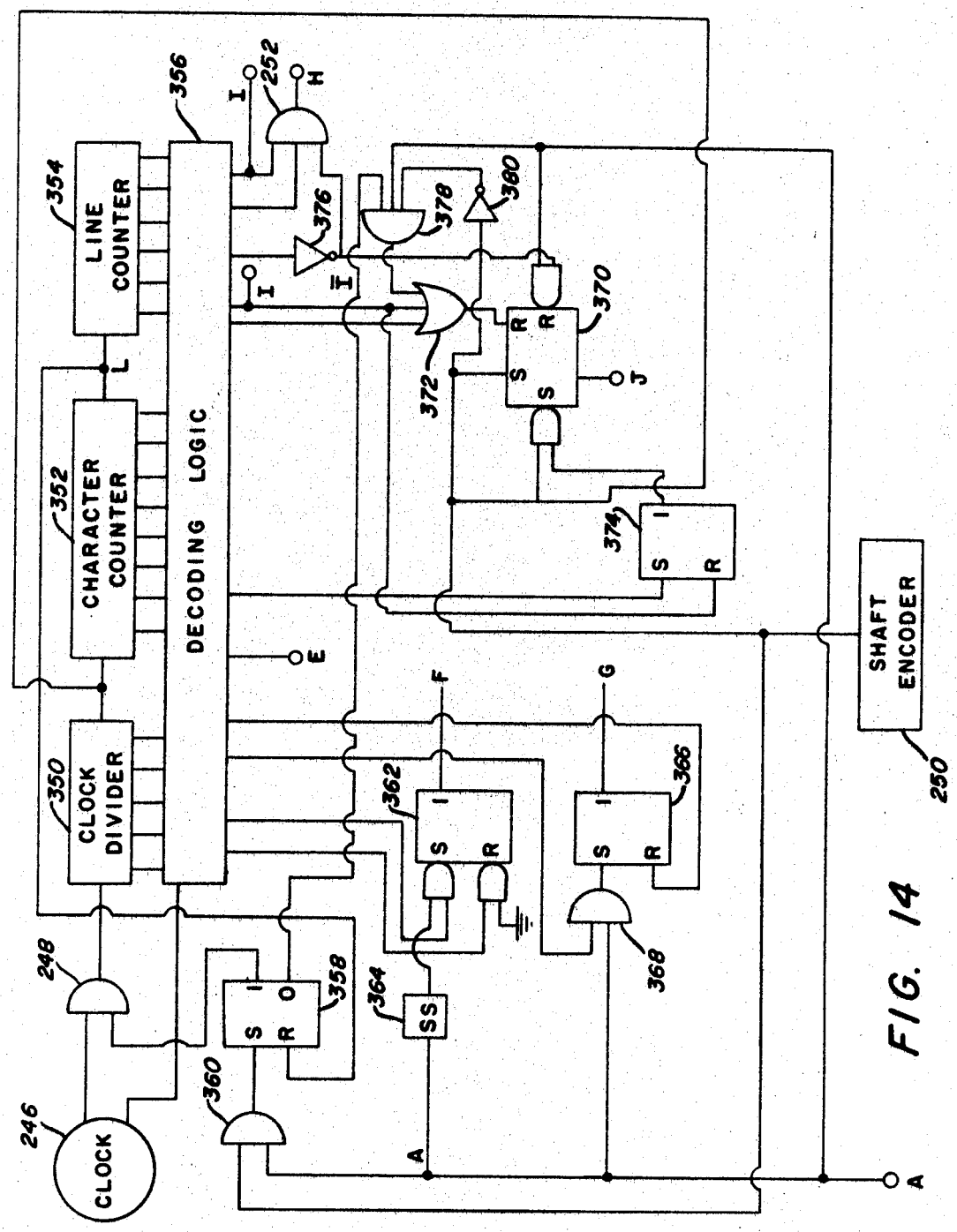
Figure 15:
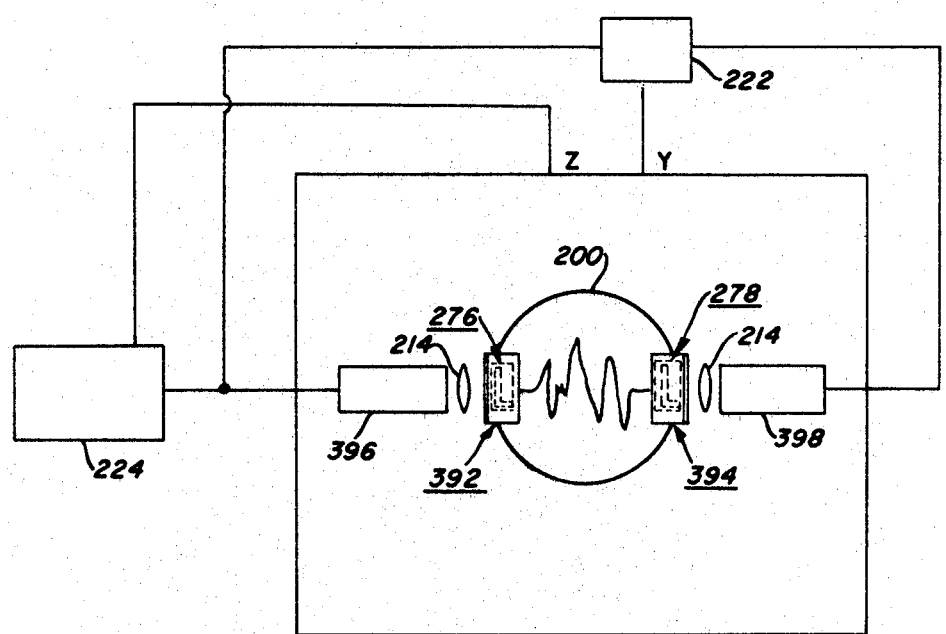
Figure 16:
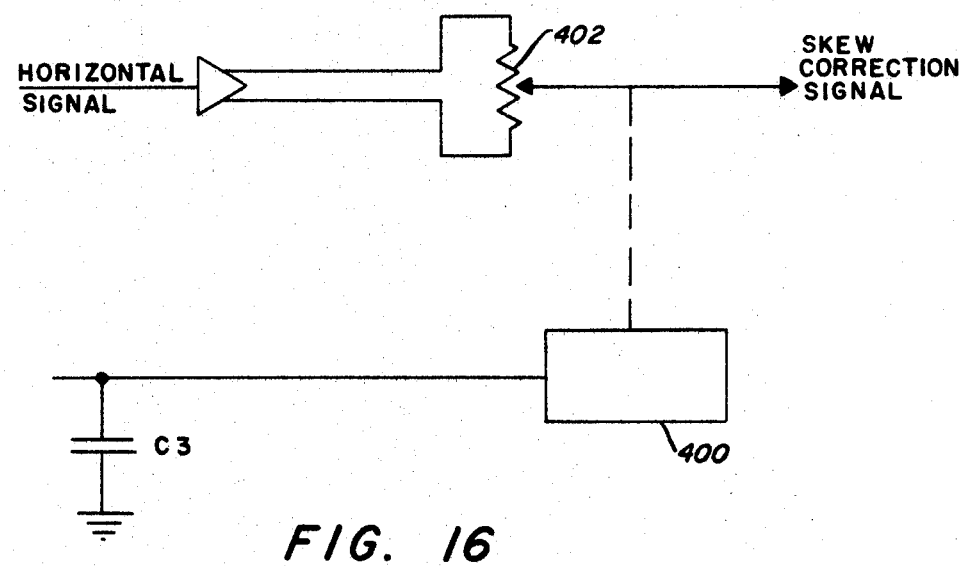

FIG. 1 is a highly schematic sectional view of one form of apparatus according to the invention;
FIG. 2 is a highly schematic sectional view by a different form of apparatus according to the invention;
FIG. 3 is a block diagram of a preferred embodiment of the invention;
FIG. 4 shows a positioning mask;
FIG. 5 shows timing waveforms for a single line;
FIG. 6 shows timing waveforms for a single character;
FIG. 7 shows a photomultiplier amplifier;
FIG. 8 shows a brightness control circuit;
FIG. 9 shows a vertical position and skew control circuit;
FIG. 10 shows a modified vertical position and skew control circuit;
FIG. 11 shows a further modified vertical position and skew control circuit;
FIG. 12 shows a horizontal sweep circuit;
FIG. 13 shows a step signal generator and unblanking delay circuit;
FIG. 14 is a block diagram of the timing and control circuits;
FIG. 15 shows a further embodiment of the invention incorporating vertical position and brightness controls only; and
FIG. 16 shows a modified skew correction circuit.

In FIG. 1 there is shown a cathode ray tube 200 including deflection means 202, and which is focused through a main mirror 204 and lens 206 onto a selenium drum 208. Deflection means 202 would ordinarily be a magnetic yoke or else a set of internal electrostatic deflection plates. For the purposes of the present invention, cathode ray tube 200 and deflection means 202 can be replaced by any suitable fixed light source operating in conjunction with an electrically controllable means for deflecting a beam of light from the light source. The light passing through lens 206 can be focused on a viewing screen or on any form of photosensitive material which can convert the light beam into a permanent image, selenium drum 208 being illustrative of such a photosensitive member.

Since recorders employing selenium drums are in widespread use and have been extensively described in the patent and technical literature, no further description of the drum 208 or of the auxiliary equipment, such as charging, developing and paper handling equipment for use therewith will be given. The described elements of FIG. 1 are typical of electro-optical display devices. The deflection means 202 will incrementally displace the light beam or spot along drum 208 in an axial direction to record a line of characters, and drum 208 will rotate in either a continuous or incremental fashion to record successive lines of characters. Alternatively, a plurality of lines can be formed by deflecting the spot in a direction opposite to that used to space the characters along a line.

If the light spot or cathode ray tube 200 is vertically displaced, then the light path will be shifted and the light will be intercepted by a positioning mirror 210 rather than striking selenium drum 208. The light deflected from mirror 210 passes through a positioning mask 212, which lies at the heart of the present invention, and then through a condensing lens 214 to a photomultiplier 216 or other photosensitive element. The output of photomultiplier 216 is fed to electronic control circuit 218 which controls horizontal (axial) positioning circuit 220, vertical positioning circuit 222 and brightness control circuit 224 in a manner which will be more fully explained in connection with subsequent figures. Positioning mask 212 has a plurality of slits coerresponding to desired character positions on drum 208. In the mode of operation of the invention as generally applicable to FIG. 1, electronic control unit 218 first operates vertical positioning circuit 222 to displace the spot from cathode ray tube 200 so that it will strike mirror 210, and then activates horizontal positioning circuit 220 to sweep the beam in a horizontal direction until it strikes a slit in mask 212, at which time photomultiplier 216 sends a signal to control circuit 218 which stops horizontal positioning circuit 220 and operates vertical positioning circuit 222 to displace the beam from cathode ray tube 200 so that it now falls once more on selenium drum 208. This process can be iterated until a complete line has been recorded. The position of each character recorded on drum 208 will correspond to the position of a corresponding slit in mask 212 and will be quite indepedent of the type or condition of horizontal deflection circuit 220 or deflectin means 202.

No means is shown in this figure to form shaped characters as opposed to simple spots of light from cathode ray tube 200, but there are at least two known ways to accomplish this. One of these is the so-called cursive method which is employed in later-described embodiments. In this method, a single spot on the cathode ray tube is made to trace out a character by very small movements in the horizontal and vertical directions with corresponding operation of the brightness control. This method can be used in any form of electro-optical display device. Another method involves the use of specialized cathde ray tubes which have shaped electron beams such that they can instantaneously display any one of a set of characters. The "Charactron" tube manufactured by General Dynamics Corporation is a well known example of this type of character display tube. The set of characters can include a single spot or vertical line for use with the positioning system of the invention.

FIG. 2 shows a modified form of the display device of FIG. 1. Mirror 210 is now a semi-transparent mirror located in the optical path from lens 206 to drum 208. Since mirror 210 always intercepts a small fraction of the light from cathode ray tube 200, a vertical deflection circuit is not essential. A vertical deflection circuit 222 is shown, however, since it is still useful for other purposes, such as correcting for skew and for compensating for aging of the cathode ray tube. FIG. 2 operates in the same way as FIG. 1 except that instead of deflecting the beam vertically between character displays, the intensity of cathode ray tube 200 is reduced in order to provide an intensity which is sufficient to actuate photomultiplier 216 but which is insufficient to be seen by the eye or recorded by drum 208.

FIG. 3 is a block diagram of the electro-optical display system. Elements identical to those in FIGS. 1 and 2 are similarly numbered. Mask 212 is shown in greater detail in FIG. 4. In accordance with conventional practice for maintaining minimum spot size, high resolution cathode ray tube 200 will be provided with a focus coil 226 connected to an adjustable power source 228, an astigmatism correction coil 230 connected to an adjustable power source 232, and a dynamic focus coil 234 connected to a control circuit 236 which receives a signal from the horizontal deflection system and modifies the electron beam focusing action to compensate for the increased length of the electron beam as the spot is deflected away from the center of the tube.

Photomultiplier 216 is connected to an amplifier 238 which provides a two-level output A as well as two separate analog outputs B and C. Analog signal B is supplied to brightness control circuit 240 and signal C is supplied to vertical position and skew control circuit 242. The two-level signal A is applied as a logical control signal to timing and logic circuit 244. The other inputs to circuit 244 are from a 500 kilocycle clock oscillator 246 as gated by clock gate 248 and from shaft encoder 250, which is mechanically connected to selenium drum 208 and provides four microsecond pulses spaced approximately seven milliseconds apart and corresponding to a linear drum advance of .0476 inch. After a group of 64 successive encoder pulses have been generated, the encoder pulse skips seven pulse times and transmits the next group of 64. The seven skips provide a pause in the operation of the illustrated display device to permit card changing and other mechanical operations to take place.

Timing and control circuit 244 generates a variety of control signals for operating other parts of the apparatus. Some of these signals are used to control mechanical components in the associated apparatus and will not be further described here. One signal, D, is used to control gate 248 and thus periodically interrupt the operation of circuit 244 itself. A vertical reference gate signal E is supplied to position and skew circuit 242 to enable it to control the vertical position of the scan on cathode ray tube 200 and a vertical skew gate signal F is also applied to permit circuit 242 to control the skew or tilt of the scan. A brightness gate signal G is supplied to brightness control circuit 240 to enable it to maintain the brightness of cathode ray tube 200 constant. A strobe signal H is generated at 44 microsecond intervals and passed through gate 252 to a digital computer 254. Upon receipt of the strobe pulse, computer 254 unloads the next successive symbol to be printed from its internal memory into symbol generator 256. The strobe pulse after being slightly delayed in delay circuit 258 commands the symbol generator to generate a sequene of X, Y, and Z control signals which will cause cathode ray tube 200 to trace out a character as determined by computer 254. Symbol generators are well known in the art and will not be described further. A suitable generator for use in the described embodiment may be obtained commercially from Raytheon Company as well as from other sources. Timing circuit 244 also generates a line $\bar{I}$ signal which inhibits gate 252 between the first and second shaft encoder pulses so that only 63 lines are printed on a card, the first line period being given over to adjusting the vertical position, skew and brightness of the cathode ray tube.

Three control signals are provided for horizontal sweep generator 260, a sweep rate signal I, which selects either a fast 6000 line per second sweep or a slower 3600 inches per second sweep, a position signal J which switches the sweep on and off, and a retrace control signal K. The output of sweep generator 260 is combined with the horizontal output of the symbol generator in the horizontal drive amplifier 262 which provides a composite horizontal drive signal to deflection yoke 212 and also to dynamic focus circuit 236. The position signal J circuit is standardized by step generator 264 and supplied as a vertical command signal to vertical drive amplifier 266, where it is combined with the vertical output signal of the symbol generator 256 and also with a vertical correction signal from position and skew control circuit 242. The output of vertical drive amplifier 266 is connected to the appropriate coils in deflection yoke 212.

The cathode ray beam is turned on and off by a Z axis amplifier 268 which is gated on either by the signals from step generator 264 or the Z axis from symbol generator 256. The amplitude of the Z axis amplifier output, and thus of the cathode ray beam, is controlled by the output signal from brightness control circuit 240. The control signals from step generator 264 are first delayed on the order of a microsecond by delay circuit 270 and the Z control signal from the symbol generator is similarly delayed by delay circuit 272. These delays are provided to compensate for the fact that the beam intensity responds instantaneously to control signals whereas the beam position responds more slowly to control signals because of the inductance of the deflection coils. The function and operation of FIG. 3 is best understood with reference to FIGS. 4 and 5.

Referring to FIG. 4, mask 212 includes 150 slits 274 corresponding to the 150 character positions in the described embodiment. An L-shaped aperture 276 appears at the left end of the group of 150 slits and a similar aperture 278 appears at the right end. The upper edges of the horizontal portions of these characters are identified by reference characters 280 and 282, respectively, and are coincident with a dashed horizontal line indicating the desired path of the light beam from cathode ray tube 200. An additional rest slit 284 appears to the left of all the other slits and apertures. A suitable form of mask consists of a strip of glass .09 inch thick by ½ inch wide covered with a silver halide photographic emulsion upon which the various slits are formed by exposure in a camera to an enlarged drawing of the desired pattern, followed by conventional photographic development and fixing. Illustratively, the slits are .003 inch wide and spaced apart at the desired character spacings. Aperture 276 has a vertical line width of .080 inch and aperture 278 has a vertical line width of .003 inch. Rest slit 284 is spaced .020 inch from the first of slits 274, and the last of slits 274 is spaced .180 inch from the right hand aperture 278.

The function of the apparatus of FIG. 3 is best understood with reference to FIG. 5 which shows the various control signal waveforms involved in recording a complete line of characters. The dashed vertical lines marked "PM" indicate control signal transitions actuated by a signal from the photomultiplier 216. All other signal transitions are timed with respect to clock 246. Initially, the output of horizontal sweep generator 260 is at a steady value such that the spot from the cathode ray tube would be aligned with rest slit 284. However, position signal J is initially off so that the cathode ray beam is initially off and the vertical positioning circuits are such that the spot would strike selenium drum 208. The sweep rate signal I is initially in the slow speed state and clock gate 248 is held open by signal D. A signal from shaft encoder 250 initiates the recording of a line and activates the position signal J which turns on sweep generator 260, applies a signal through step generator 264 to vertical line amplifier 266 to deflect the cathode ray beam so as to intercept mirror 210, and thereafter activates the Z axis amplifier 268 to turn on the spot which commences to sweep from left to right along the mask 212 Delay circuit 270 ensures that the beam is not turned on while it might still strike the selenium drum 208 rather than be intercepted by mirror 210. Within a few microseconds, the moving spot will strike the left edge of L-shaped aperture 276 and close clock gate 248 to start the internal timing operation of the timing and logic circuits 244. The description of the functions of L-shaped apertures 276 and 278 and their associated control signals will be deferred until after the description of the basic timing functions has been completed. The position signal J remains on for about 63 microseconds after the clock gate has been closed, at which time signal J turns off, the scan is stopped for a short period, and the sweep rate signal I is changed to the fast state. At 88 microseconds from the closing of the clock gate, the position signal J is again turned on and again causes the light spot to sweep along mask 212 until it strikes the first of slits 274, at which time the light passing through to photomultiplier 216 causes the position signal to be turned off which instantaneously stops the horizontal scan, turns the beam off, and operates step generator 264 to deflect the spot upwards so that it will strike drum 208 when turned on.

At 44 microseconds after the position control signal J was last turned on, it will be turned on again and again activate sweep generator 260, step generator 264 and the Z axis amplifier 268 to cause the spot to sweep to the next one of slits 274, at which time a signal from the photomultiplier will again turn the position signal J off. This process is repeated until the beam has stopped at each of the 150 slits 274. At 44 microseconds after moving to the last of slits 274, the sweep rate control signal I will be turned to the fast state and the position control signal J will be turned on for 96 microseconds to cause the spot to sweep across L-shaped aperture 278. At the end of that interval, the position signal J will be turned off and about two microseconds later, the retrace signal K will be turned on for 78 miscoseconds, which is long enough to cause the spot to retrace to somewhere left of rest slit 284. At the end of the retrace time, clock gate 248 is opened to stop further timing operations and the position signal J is again turned on until the spot reaches rest slit 284, at which time the position signal J is turned off and the entire circuit remains in a quiescent condition unitl the next shaft encoder pulse is received to initiate the recording of a new line.

FIG. 6 shows in greater detail the timing of a single symblo generating period. The uppermost line shows the position signal J, as described in connection with the previous figure. Symbol generator 256 is actuated by a write strobe signal H which is delayed about seven microseconds from the time that the position signal is turned on. In the present embodiment, seven microseconds is a sufficient time to ensure that the cathode ray beam is stabilized at a new position. Within 1.6 to 2.8 microseconds after receiving the strobe signal, symbol generator 256 will commence tracing out the symbol commanded by computer 254 by deflecting the beam from the equilibrium position determined by sweep generator 260 and step generator 264 and by turning the beam on and off at appropriate times. The time required to trace out a symbol will very with the complexity of the particular symbol but does not exceed the illustraetd 33.6 microseconds. Thus, the 44 microseconds allotted to each successive character includes a margin of safety in the time allotted for the spot to travel from one position to the next and for the time required to trace out a symbol on the cathode ray tube.

Referring once more to FIG. 5, it is seen that as the beam strikes the left hand edge of L-shaped aperture 276, brightness gate signal G is turned on and remains on for 19 microseconds. This signal is supplied to brightness control circuit 240 and permits it to amplify a signal from the photomultiplier 216 and apply it as a control signal to the Z axis amplifier 268. During the time in which the beam is sweeping across the vertical part of the character 276 there is thus established a negative feedback loop from photomultiplier 216 through photomultiplier amplifier 238, brightness control 240, Z axis amplifier 268, cathode ray tube 200 and back to photomultiplier 216 by way of the light beam from cathode ray tube 200. This feedback loop adjusts the output of cathode ray tube 200 to a predetermined photomultiplier output, thus compensating for any aging of cathode ray tube 200. At the end of the brightness gate signal, the feedback loop is opened and brightness control circuit 240 continues to supply to Z axis amplifier 268 that same control voltage which was determined during the brightness gate interval.

A vertical reference gate signal E is generated shortly after the end of the brightness gate signal G and is timed to correspond to the period in which the beam is sweeping across the upper edge 280 of aperture 276. This signal gates on position and skew control circuit 242 to complete a feedback loop from the photomultiplier amplifier 238, position circuit 242, vertical deflection amplifier 266, deflection yoke 212 and the beam itself. If the beam position is above edge 280, photomultiplier 216 will receive no light and a downward deflection signal will be generated. If the beam is below edge 280, maximum light will be received by the photomultiplier and an upward deflection signal will be generated. In this way, the system will be brought to an equilibrium with the beam positioned exactly at edge 280. At the end of the vertical gate signal, the feedback loop will be opened and the output of position circiut 242 will be clamped at that value which positioned the beam along edge 280. When the beam stirkes the second aperture 278, vertical skew gate signal F is turned on for part of the interval during which the beam is sweeping along edge 282. To simplify the control circuitry, the vertical skew signal is turned off at a fixed time rather than having a fixed duration from its initiation by a signal from photomultiplier 216. The previously described feedback loop is again activated and forces the beam to edge 282 of aperture 278 if it is not already on the edge. When the vertical skew gate signal F is turned off, position and skew control circuit 242 remembers the amount of correction required to bring the beam to edge 282 and generates a skew correction waveform which is aplied to vertical deflection amplifier 266 during the next subsequent line of recording.

Timing and logic circuit 244 also generates a $\overline{1}$ signal after the first shaft encoder pulse in a group, which is used to inhibit the strobe pulses H otherwise supplied to computer 254 and symbol generator 256. Because of this, no symbols are recorded along what would otherwise be the first line of recording, but the line is instead used to make sure the beam brightness, position, and skew, are properly adjusted when symbols are actually recorded along the next and subsequent lines.

FIG. 7 is a circuit diagram of photomultiplier amplifier 238. The output signal from photomultiplier 216 is coupled to an emitter follower transistor Q1 which is in turn coupled to a Schmitt trigger circuit 286 which generates a two-level control signal A in response to the intensity of light falling on photomultiplier 216. The output of Schmitt trigger 286 is connected to an emitter follower 288 which provides a low impedance for driving other logic circuits. In the described embodiment of the invention, ON or logical $1 \simeq 0$ volts and OFF or logical $0 \simeq -12$ volts. Zener diode CR2 protects Schmitt trigger 286 from excessive input voltages. The output of Q1 is shifted 43 volts upwards in voltage by Zener diode CR2 and applied to emitter follower Q2, the output of which is an analog signal B which is further shifted by Zener diode CR3 and applied to brightness control circuit 240. A fraction of the photomultiplier output voltage, as determined by potentiometer 290, is applied to emitter follower 292 and from there as signal C to position and skew control circuit 242.

FIG. 8 shows the automatic brightness correction circuit 240 in greater detail. There is shown a fixed negative polarity current generator consisting of transistors Q3 and Q4 and an opposing positive polarity variable current generator, consisting of Q5 and Q6, which generates a current proportional to the input brightness signal B from photomultiplier amplifier 238. The combined output of the two constant current generators is passed through a diode gate 294 consisting of diodes CR4, CR5, CR6, and CR7 to an integrating capacitor C1. During the brightness gate interval, gate control transistor Q7 is turned on by the brightness gate signal which is shifted above its normal on potential by Zener diode CR9. At other times, gate control transistor Q7 is turned off by the brightness gate signal G, permitting the gate diodes to be biased off and thus disconnecting the constant current generators from integrating capacitor C1. A dual emitter follower consisting of transistors Q8 and Q9 presents a high input impedance to capacitor C1 and permits the capacitor voltage to be applied to other parts of the apparatus without discharging the capacitor. Q8 and Q9 might be replaced by a single field affect transistor. A fraction of the capacitor voltage is selected by a potentiometer 296 and applied to emitter follower Q10, the output of which is shifted upwards by Zener diode CR9 and potentiometer 298 and applied to an output emitter follower Q11. The output of Q11 is in turn applied to the Z axis amplifier 268 of FIG. 3, which controls the cathode ray tube brightness. If, during the brightness gate interval, the cathode ray tube brightness is such that the two constant current generators have equal current outputs, no charge will be added to or subtracted from capacitor C1. If, however, the brightness differs from this predetermined amount, the output of the variable current generator consisting of Q5 and Q6 will be changed. If the output of the variable current generator exceeds that of the fixed current generator, then capacitor C1 will charge up positively, but if the output of the variable current generator is less than that of the fixed current generator, then capacitor C1 will be charged negatively. Since the voltage on capacitor C1 controls the cathode ray tube brightness, the brightness will be altered in a direction such as to equalize the outputs of the two constant generators. This equalization will be achieved within the brightness gate interval and capacitor C1 will thereafter be disconnected from the current generators by the diode gate 294 and will hold the cathode ray tube brightness at the predetermined value. The use of constant current rather than voltage generators permits capacitor C1 to uniformly integrate the brightness error and achieve a zero error with respect to the desired brightness.

FIG. 9 shows the position and skew control circuit 242. Input signal C from photomultiplier amplifier 238 is amplified by an inverting input amplifier 300 comprising transistors Q12, Q13, Q14, and Q15, and then passed through a normally open gate circuit 302 to a storage capacitor C2. A high input impedance unity gain buffer amplifier 304 comprising transistors Q16 and Q17 transfers the voltage on capacitor C2 through a normally closed gate 306 to an output amplifier 308 comprising transistors Q18, Q19, Q20, and Q21, the output of which is applied to an input of vertical drive amplifier 266. While the spot is traveling past edge 280 of aperture 276 of mask 212, the vertical position signal E acting through gate driver 310 will close gate 302. A complete feedback loop will thus be formed from the photomultiplier amplifier 238 through the input amplifier 300, through gate 302, through the buffer amplifier 304, through gate 306, through the output amplifier 308, and through the vertical deflection amplifier 266 and the cathode ray spot back to the photomultiplier. This feedback loop will quickly bring the cathode ray spot into alignment with edge 280 of the positioning mask 212. At the end of the vertical position signal gate 302 will open, thus interrupting the feedback loop, but capacitor C2 will store the previously determined vertical position signal so that the output signal from amplifier 308 will be held at the proper value to keep the cathode ray spot along the desired line.

When the spot reaches the edge 282 of aperture 278, the vertical skew signal F acting through gate driver 312 will open gate 306 thus disconnecting capacitor C2 from the output amplifier. At the same time, the vertical skew signal acting through gate drivers 314 and 316 activates a second feedback path through the input amplifier 300, through gate 318 to a second storage capacitor C3, and through a buffer amplifier 320 comprising Q22 and Q23 and trough gate 322 to the input of the output amplifier 308. This feedback loop operates in a manner similar to the previously described one to bring the cathode ray spot to edge 282 of aperture 278, except that the necessary correction voltage is stored on capacitor C3 instead of C2. At the end of the vertical skew signal, both gates 318 and 322 opened and gate 306 is closed so that the vertical spot position is again controlled by the potential on capacitor C2. The stored potential on capacitor C3 is level-shifted by Zener diode CR10, potentiometer 324 and emitter follower Q24 and applied to a constant current generator Q25 which is connected to storage capacitor C2. Assuming that no potential is required to align the left hand end of the sweep with edge 280, the potential required to bring the right hand end of the sweep into alignment with edge 282, as stored on capacitor C3, will be a measure of the skew to be corrected. The voltage on capacitor C3 is used to generate a constant current which gradually charges capacitor C2 to produce a vertical output signal which varies linearly with time and at a suitable rate to compensate for the skew as measured by capacitor C3. In a practical device, however, some vertical control signal will be required to align the left edge of the sweep with edge 280 and the potential stored on capacitor C3 will not directly indicate the amount of skew to be corrected. For this reason, the potential applied to constant current generator Q25 can be shifted by potentiometer 324 with respect to the voltage on capacitor C3 so that Q25 generates an output current only when the voltage on capacitor C3 differs from that initially stored on capacitor C2 at the end of the vertical position signal. In the illustrated embodiment, transistor Q25 can generate a current of one polarity only and can therefore compensate for only one direction of skew. While a reversible constant current generator could be employed, as shown for example in FIG. 8, satisfactory operation can be had by deliverately positioning the deflection yoke 212 to introduce a slight amount of skew such that the optimum skew correction currents will always be of a single polarity despite such variations of uncorrected skew as may occur.

FIG. 10 shows a modified position and skew control circuit which is fully automatic. The greater part of the circuit is identical to that of FIG. 9. In a desirable embodiment of the circuit, the charging time constant of capacitor C3 is greater than the length of the skew control signal. The introduction of resistor 326 between input amplifier 300 and capacitor C3 is one way of accomplishing this. With such an increased time constant, several sweeps may be required to completely correct for skew, but there is less dependence on critical circuit components. Since the difference between the voltage on capacitor C2 at the end of the vertical gate signal and the voltage on capacitor C3 is a measure of the amount of skew, these two voltages are compared in a differential amplifier 328. The vertical gate signal acting through an additional gate driver 330 opens gate 332 and permits a capacitor C4 to be charged to a voltage proportional to the skew. At the end of the vertical reference signal, gate 332 is closed and capacitor C4 retains the skew measurement. It is this signal on capacitor C4 which is transferred by a buffer amplifier 334, level shifted in Zener diode CR11, and applied to constant current generator Q26 which is opposed by a fixed constant current generator Q27. Q26 and Q27 form a reversible constant current generator, the output of which is applied to capacitor C2 to linearly charge or discharge the capacitor in proportion to the amount of detected skew to be corrected.

FIG. 11 shows a further form of position and skew correction circuit. The components used to adjust the spot at aperture 276 are the same as in previous figures except that gate 306 has been eliminated and output amplifier 308 has been replaced by an output summing amplifier 336. During the skew gate signal F, an additional feedback circuit is activated through a constant current generator 338, gate 318, capacitor C3, buffer amplifier 320, and amplifier 336. In this circuit, however, the voltage on capacitor C3 is added in amplifier 336 to the voltage remaining on capacitor C2 at the end of the sweep. Accordingly, the voltage on capacitor C3 represents a skew correction signal and is used to control constant current generator 340 which is connected to capacitor C2. If the proper voltage is stored on capacitor C3 at the beginning of a skew control signal, no further voltage will be required to be delivered to the vertical drive amplifier to correct the spot position and the voltage on capacitor C3 will thereafter remain unaltered. If a skew error is detected, then constant current generator 338 will apply an increment of charge to capacitor C3 to change its voltage in the proper direction. Several sweeps may be required to achieve full skew correction, but such correction is not critically dependent on any circuit parameters. If the retrace and waiting times are not constant from line to line, it may be desirable to gate constant current generator 340 off during such times, or at least during the waiting time. In terms of the waveforms shown in FIG. 5, constant current generator 340 could illustratively be gated on whenever the clock gate signal D is on and the retrace signal K is off.

FIG. 12 shows the horizontal sweep circuit 260. Three input control signals, I, J, K, are provided as described previously. Of these, the position control signal J is coupled to a constant current generator transistor Q28 which supplies a constant negative charging current to integrating capacitor C5. The retrace signal K similarly turns on a constant current generator Q29 which charges capacitor C5 in a positive direction. Since the current output of this type of constant current generator is proportional to the base voltage referenced to the emitter supply voltage and inversely proportional to the emitter resistance, transistor Q30 is placed across part of the emitter resistor for Q28 and is switched on by the sweep rate signal I. When Q30 is turned on, the base resistance to Q28 is lowered and it delivers a larger current to capacitor C5. Accordingly, when the position signal J is turned on, capacitor C5 will charge up negatively at a first rate if the sweep rate signal I is off and at a second and higher rate if the sweep signal is on. When the position signal J is off and the retrace signal is on, capacitor C5 will charge up in a positive direction. When both the position and retrace signals are off, capacitor C5 will hold a constant voltage, except for the effects of any internal leakage currents or leakage currents in Q28 and Q29 or in other circuits connected to it. To minimize the latter effect, capacitor C5 is connected to a high input impedance unity gain Darlington amplifier consisting of transistors Q31 and Q32. A Zener diode CR12 and potentiometer 342 permit the DC level of the Darlington output signal to be shifted as required for horizontal positioning purposes. The signal taken from potentiometer 342 is amplified by a unity gain low output impedance amplifier consisting of transistors Q33, Q34, Q35 and Q36 and is applied to horizontal deflection driver amplifier 262. Typically, the output signal will have a range of about plus or minus 5 volts. Because of the inherent positioning accuracy provided by the present invention, the circuit of FIG. 12 is not at all critical except for the single, easily satisfied, requirement that the output voltage remain constant for at least 44 microseconds when the input signals are turned off. The ramp voltages generated by the circuits are not at all critical as to slope or linearity and these parameters may be allowed to change with time, temperature, signal voltages, or power supply voltages without affecting the horizontal positioning accuracy which can be achieved by the invention.

FIG. 13 shows the circuits of step generator 264 and delay circuit 270. A voltage regulator comprising transistor Q37 and Zener diode CR13 provides a regulated output of 9 volts which is employed as the collector supply voltage for transistor Q38. The inverse of the position signal J is used to switch Q38 on and off to generate a collector potential which varies reproducibly between 9 volts and about 0 volt. This voltage is current-amplified in emitter follower Q39 and applied to vertical driver amplifier 266. Meanwhile, the position signal J itself is applied to a single shot multivibrator 344 which generates an output transition about 2 microseconds after the beginning of the position signal and which is used to set flip-flop 346. The flip-flop is reset at the end of the position signal by a connection to the inverse position signal J̄. The resulting output signal of flip-flop 346 is the same as the position signal J except that the leading edge has been delayed about 2 microseconds. The flip-flop output is amplified in a complementary emitter follower comprising transistors Q40 and Q41 and is applied as an unblanking signal to the Z axis amplifier 268.

FIG. 14 shows the timing and control circuits schematically, but in greater detail than in FIG. 3. Clock oscillator 246 generates two 500-kilocycle square waves, 180° out of phase from each other. Phase A is passed through clock gate 248 and divided down in turn by clock divider 350 which is a five stage counter with internal feedback so as to divide by 22, by character counter 352 which is an eight stage counter with internal feedback so as to divide by 156, and a six stage line counter 354 which counts to 64. The basic timing format therefore consists of 64 lines of 156 "characters," the length of each "character" being set at 44 microseconds by clock divider 350. As shown in FIG. 5, characters 2 through 151 are used for recording the 150 symbols per line and characters 0 and 1 and characters 152 through 155 are given over to beam stabilization and other control functions. A decoding logic circuit 356 is connected to the outputs of the individual counter states, not shown, and also to phase B of clock 246. Through the use of familiar gating techniques, decoding circuit 356 can generate any set of control waveforms with transitions controllable at one microsecond increments. Some of these control signals have been described in connection with FIG. 5 and will be further explained. Other waveforms are required for the internal operation of the control circuitry and will be described as required.

Counters 350, 352, and 354 do not operate continuously since clock gate 248 disconnects the clock generator at the end of every line as controlled by flip-flop 358. When the character counter reaches a count of 156 and resets to 0, it provides an output pulse L which advances line counter 354 by one pulse and also resets flip-flop 358, thus opening clock gate 248 at a time at which both the character counter 352 and clock divider 350 have an internal count of 0. As described in connection with FIG. 5, the appearance of a shaft encoder pulse causes the cathode ray spot to start sweeping from the rest slit 284 towards aperture 276. When the spot strikes aperture 276 a signal A is generated by photomultiplier 216 and photomultiplier amplifier 238 while the shaft encoder pulse is still "ON." The coincidence between the shaft encoder pulse and the onset of the photomultiplier pulse is detected in AND gate 360, the output of which sets flip-flop 358 which in turn enables the clock divider 350 and character counter 352 to start counting from zero.

The vertical skew gate signal is generated by a flip-flop 362 which is enabled during character 153 and set by a pulse from the photomultiplier as the cathode ray tube spot reaches aperture 278 in mask 212. Preferably, the photomultiplier pulse is delayed one or two microseconds by a single shot circuit 364. Flip-flop 362 is reset and the skew gate signal terminated by a signal from decoding logic 356 at 36 microseconds after the start of character 153.

The brightness control signal G is generated by flip-flop 366 which is set through AND gate 368 by a coincidence of the photomultiplier signal A, generated when the spot reaches aperture 276, and a character 0 signal from decoding logic 356. Flip-flop 366 is reset by a repetitive signal appearing 20 NS after the start of each character.

The position control signal J is generated by flip-flop 370 which is provided with both direct-coupled and gated inputs. Flip-flop 370 is initially set at the beginning of a line by a signal from shaft encoder 250. The flip-flop is next reset at 19 microseconds after the start of character 1 by a signal from decoding circuit 356 which passes through OR gate 372.

The next subsequent character counter set pulse P will again set flip-flop 370, since control flip-flop 374 is initially set and continuously enables the gates set input to flip-flop 370. As soon as the cathode ray spot strikes the first of slits 274 on mask 212, the signal A from photomultiplier will be enabled by the inverse sweep rate signal Ī from inverter 376 to reset flip-flop 370. This sequence of setting and resetting flip-flop 370 is carried out 150 successive times to position the cathode ray spot at the 150 predetermined recording positions. At 43 microseconds after the start of character 151, the sweep rate signal I will turn off and one microsecond later the next character counter set signal P will again set flip-flop 370. However, the absence of the sweep rate signal will prevent the light reaching photomultiplier 216 through aperture 278 of mask 212 from resetting flip-flop 370. At 8 microseconds after the start of character 154 flip-flop 370 will be reset by a signal from decoding logic 356 passing through OR gate 372 and the decoding logic will then generate a retrace signal to cause the spot to retrace to the left end of mask 212. At the same time that flip-flop 370 is reset the same signal will reset control flip-flop 374, rendering flip-flop 370 unresponsive to further character counter set pulses P. Soon afterwards, 43 microseconds after the start of character 155, a further signal from decoding logic 356 will set control flip-flop 374, permitting the 156th and final character counter set pulse to once again set flip-flop 370 and start the cathode ray spot sweeping toward rest slit 284. When the spot strikes rest slit 284, AND gate 378 will detect a coincidence between the photomultiplier pulse and the absence of the clock gate signal and of the shaft encoder signal to reset flip-flop 370 through OR gate 372, thus preparing the system for the reception of a shaft encoder pulse and the repetition of the line printing cycle thus described. Inverter 380 is provided to generate the inverse of the shaft encoder signal.

The write strobe signal H is basically a repetitive signal generated at 7 microseconds after the start of each of characters 2 through 151. It is formed by AND gate 384 as a coincidence of the inverted sweep rate signal Ī, a signal Ī which appears at all times except during count zero of line counter 354, and a signal which appears 7 NS after the start of each character. Thus, the strobe signal is generated seven microseconds after each of the 150 characters in a line which are reserved for symbol generation, except that no symbols are generated during an initial line in order to permit that line to be used for correcting the spot position, skew, and brightness in order that the first recorded line be perfect.

Although the embodiment of FIGS. 3 through 14 employs a single photomultiplier to control both horizontal and vertical positioning as well as brightness, it may also be useful in other applications such as precision oscillographs, where incremental horizontal advances are not desired, to make use only of the vertical control aspects of the invention. FIG. 15 schematically illustrates such an embodiment, including a cathode ray oscilloscope 390 with a cathode ray tube 200 shown face-on. A small mask 392 is positioned in front of the left side of the tube face and contains an aperture 276 similar to that shown in FIG. 4. A second mask 394 is positioned at the right side of the tube and contanis an aperture 278 similar to that of FIG. 4. A mirror 210 and lens 214 are used to focus the light from mask 392 onto a photomultiplier 396. A similarly numbered mirror and lens are used to focus the light from mask 394 onto a photomultiplier 398. Two photomultipliers are used in this embodiment to provide a simple optical path and to leave most of the face of cathode ray tube 200 uncovered for easy viewing. Photomultiplier 396 operates a brightness control circuit 224 similar to the previously described circuit 224 and photomultipliers 396 and 398 jointly operate a position and skew control circuit 222 similar to the previously described circuit 222. Photomultiplier 396 can be used to charge a capacitor C2 as in FIGS. 9 through 11, and photomultiplier 398 to charge a capacitor C3 as in FIGS. 9 through 11. The control circuit output signals are applied to the oscilloscope vertical and brightness inputs together with the external signals which are to be displayed. Although no control is provided over horizontal positioning, the accurate control of vertical positioning and skew facilities quantitative interpretation of the oscilloscope display and a standardized level of brightness permits reliable photographic recording of the oscilloscope display.

The skew correction circuit shown in FIGS. 9 through 11 generates a time dependent vertical correction signal which is effective where the horizontal sweep velocity is reasonably uniform, as in the illustrated embodiment. Where the horizontal sweep is variable in speed or operates in an unpredictably intermittent fashion, as where symbols to be printed are received at a fixed or variable rate less than the display capability of the display device, different arrangements for correcting skew must be used. FIG. 16 shows one arrangement whereby the invention may be adapted for use with a non-uniform sweep. The skew control voltage stored on capacitor C3 (FIGS. 9 through 11) is used to operate an electromechanical servo 400 which positions the slider on a potentiometer 402. A balanced horizontal deflection signal is applied to the potentiometer and the output voltage, which is a small positive or negative fraction of the horizontal signal, is applied to the vertical deflection amplifier. This arangement will tilt the scan line by a fixed amount regardless of the speed or direction of the sweep. An electronic multiplier can also be used instead of servo 400 an potentiometer 402. Where the type of skew control exemplified by FIGS. 9 through 11 is used, it may also be preferred to employ a discontinuous line advance of the selenium drum 208 or corresponding recording element, and to position mask 212 exactly perpendicular to the direction of line advance.

While the invention has been described primarily in terms of a specific embodiment, numerous variations are possible within the scope of the invention and will immediately occur to those skilled in the art. For example, mask 212 may comprise opaque lines on a transparent base or may consist of a reflective surface with suitably located non-reflective areas. The only requirement is that the mask enable the photomultiplier to detect the presence of the spot at predetermined positions. The photomultiplier itself is merely illustrative of a photosensitive device, and may be replaced by photocells, photodiodes, phototransistors, or other light sensitive devices capable of generating or modulating an electrical signal. Although a single step deflection means has been described, cascaded deflection means may also be employed. Where a cathode ray tube is used, a separate set of deflection coils may be connected execulsively to the symbol generator. Thus, one set of deflection coils will provide the horizontal deflection for spot positioning and vertical corrections, while the other set of coils will provide the lesser deflection required for symbol generation. The expense of the extra set of coils is compensated for by greater simplicity of the deflection circuits and freedom from interaction between the positioning and symbol generating circuits. Another example of a two stage deflection system is the use of a mirror galvanometer, to provide the basic horizontal positioning, in series with a high speed but low deflection angle magnetostrictive or piezo electric deflector to trace out symbols.

While it is convenient to have one slit for each character position, it is possible to employ a larger number of slits to permit greater freedom of position for the characters, or to employ fewer slits and empoly conventional electronic analog signals to position characters intermediate the slits with greater accuracy than could be obtained without the use of the slits in conjunction with the present invention. Additional freedom of display format can be had by mechanically moving the mask or by substituting one mask for another. Various display formats may be employed and the particular circuits and mask configurations described for creating this format may be replaced by other forms of circuitry and masks without departing from the invention. The terms horizontal and vertical as used herein have no absolute significance but merely denote a direction along a display line and a direction corresponding to line advances.

Moreover, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. The method of forming an electro-optical display comprising advancing a light spot in a first coordinate direction along a reference mask structure, interrupting said advancing in response to a change in light level at a photodetector when said light spot reaches an index mark on said mask, and displaying a symbol at the coordinate value of said index mark.

2. The method of claim 1 including advancing the light spot to a next subsequent index mark and displaying a symbol at the coordinate value of said second index mark.

3. Electro-optical display apparatus comprising an optical system to focus a light spot from a light source onto a display surface;
   a positioning reference mask including a plurality of position index marks disposed along a first direction;
   repositioning means to focus a light spot from said light source onto said positioning mask;
   horizontal scanning circuit mean to deflect said light spot along said mask in said first direction;
   a photodetector positioned with respect to said mask so that the incident light intensity thereon varies as said light spot reaches an index mark on said mask; and
   a positioning circuit connected to said photodetector and said deflection circuit and responsive to a change in the output of the photodetector to stop said horizontal scanning circuit and allow said light spot to be focused on said display surface.

4. The apparatus of claim 3 including a restart circuit to restart said horizontal scanning circuit after each time it has been stopped by said positioning circuit.

5. The apparatus of claim 4 in which said repositioning means comprises a vertical deflection circuit to deflect said light spot by a fixed increment and a second optical system to intercept said light spot when so deflected.

6. The apparatus of claim 4 in which said repositioning means comprises a beam splitter.

7. The apparatus of claim 5 including first unblanking means connected to said repositioning circuit to turn on said spot when deflected.

8. The apparatus of claim 5 further including symbol generating means to display a symbol on said display surface when said horizontal scanning circuit is stopped.

9. The apparatus of claim 4 in which said light source is a part of the apparatus and comprises a shaped beam cathode ray tube and further including symbol display means to display a symbol from said shaped beam cathode ray tube on said display surface.

10. The apparatus of claim 7 further including in combination a second unblanking circuit and supplemental vertical and horizontal deflection circuits to cause the light spot to trace out a symbol when the horizontal scanning circuit is stopped by said positioning circuit.

11. The apparatus of claim 10 further including on said positioning mask at least a vertical position reference mark having an edge aligned in the horizontal scanning direction;
 a feedback control circuit including a photodetector and a vertical deflection circuit to position said light spot at said edge and a memory circuit to hold the output of said feedback control circuit.

12. The apparatus of claim 10 further including on said positioning mask at least a vertical position reference mark having an edge aligned in the horizontal scanning direction;
 a first feedback control circuit including said photodetector and a vertical deflection circuit to generate a vertical correction signal to position said light spot at said edge; and
 a holding circuit to hold said correction signal constant except when said horizontal sweep circuit sweeps the light spot past said vertical reference mark.

13. The apparatus of claim 12 further including on said mask a vertical skew reference mark having an edge colinear with said vertical position reference mark;
 a second feedback control circuit including said photodetector and said vertical deflection circuit to generate a control signal to position said light spot at said edge of said skew reference mark;
 a holding circuit to hold said skew correction signal constant except when said horizontal sweep circuit sweeps the light spot past said skew reference mark; and
 a skew correction circuit responsive to said held signal to generate a horizontal position dependent vertical skew correction signal.

14. The apparatus of claim 13 in which said skew correction circuit comprises a constant current generator.

15. The apparatus of claim 13 further including on said positioning mask a horizontal extended brightness reference mark to direct a predetermined portion of the light from said light source to said photodetector;
 a feedback control circuit including said photodetector for adjusting the output of said light source to generate an intensity control signal for said light source to bring the output of said photodetector to a predetermined value; and
 a holding circuit to hold said brightness control signal constant except when said horizontal sweep circuit sweeps the light spot past said brightness reference mark.

16. A cathode ray tube recorder for recording alphanumerical symbols in accurately located columns, comprising:
 a cathode ray tube;
 circuit means to form a single small spot on the face of said cathode ray tube;
 at least one horizontal deflection drive circuit;
 at least one vertical deflection drive circuit;
 a movable photosensitive recording medium;
 first lens means to focus said spot onto said recording medium when said spot is along a first zone of said cathode ray tube;
 a positioning mask having a horizontal reference mark for each column to be recorded, said marks being disposed along a line;
 lens means to focus said spot onto said positioning mask when said spot is along a second zone of said cathode ray tube;
 a photodetector positioned to be responsive to the light in said light spot as modulated by said marks on said mask;
 a first vertical deflection circuit for shifting said spot a fixed increment between said first and second zones;
 a first unblanking circuit coupled to said first vertical deflection circuit for unblanking said cathode ray tube when said spot is in said second zone;
 a first horizontal deflection circuit coupled to said first vertical deflection circuit for horizontally advancing said spot when in said second zone;
 a reference mask detection circuit driven by said photodetector and coupled to said first vertical deflection circuit, said first unblanking circuit, and said first horizontal deflection circuit to inactivate said first unblanking circuit and said first vertical deflection circuit and to return said spot to said first zone when said spot strikes a horizontal reference mark on said mask;
 a symbol generator including a second horizontal deflection circuit, a second vertical deflection circuit, and a second unblanking circuit to make said spot trace out a symbol after said reference mark detects a horizontal reference mark; and
 a control circuit to operate said first vertical deflection circuit after said symbol generator has traced a symbol.

17. The recorder of claim 16 further including:
 a pair of spaced apart vertical reference marks on said mask, each of said vertical reference marks having an edge, said edges being colinear with said line and aligned in the direction of spot advance;
 a first servo circuit including said photodetector and a third vertical deflection circuit to bring said spot to said edge of one of said vertical position marks while said spot passes said mark;
 a first clamping circuit to clamp the output of said circuit at other times;
 a second servo circuit including said photodetector and a fourth vertical deflection circuit to bring said spot to said edge of the second of said vertical position mark while said spot passes said mark;
 a second clamping circuit to clamp said second servo circuit and disconnect said fourth deflection circuit at other times; and
 a skew correction circuit responsive to the clamped output of said second servo circuit to generate a skew correction signal for adding to the clamped output of said first servo circuit.

18. An electro-optical stabilization system for use with an electro-optical device generating a scanning light spot comprising:
 a first scan positioning mask located on said device so as to be illuminated by said light spot at the start of a scan;
 a second scan positioning mask located on said device so as to be illuminated by said light spot at the end of a scan;
 each mask having a vertical reference mark including an edge, said edges being colinear and in the direction of scan;
 a first servo circuit including a photodetector sensitive to light from said light spot and a vertical deflection circuit, said first servo circuit being operated while said spot scans across that first mark to bring the spot to said edge, and being clamped before the spot leaves said first mask;
 a second servo circuit including a photodetector sensitive to light from said light spot and a vertical deflection circuit, said second servo circuit being operated while said spot scans across said second mask to bring the spot to said edge and being clamped and disconnected from said vertical deflection circuit before a spot leaves said second mask; and a correction circuit responsive to the clamped value of said second servo circuit to generate a correction voltage substantially equal to the product of a constant times the horizontal scan position, the absolute value of said constant being proportional to the clamped value of said second servo circuit, said correction signal being added to the clamped output of said first servo circuit.

References Cited

UNITED STATES PATENTS

| | | | |
|---|---|---|---|
| 2,269,599 | 1/1942 | Moodey | 178—19 |
| 2,540,016 | 1/1951 | Sunstein | 340—324.1 |
| 2,762,862 | 9/1956 | Bliss | 178—15 |
| 3,091,759 | 5/1963 | Shanahan | 178—20 |
| 3,195,405 | 7/1965 | Clark | 250—227 |
| 3,286,083 | 11/1966 | Nielsen | 340—324.1 |
| 3,329,947 | 7/1967 | Larrowe | 340—324 |
| 3,340,360 | 9/1967 | Celio | 178—6.8 |
| 3,356,854 | 12/1967 | Humphrey | 250—227 |
| 3,050,581 | 8/1962 | Bomba et al. | 250—202 |
| 3,276,008 | 9/1966 | Hauerbach | 340—324.1 |

THOMAS B. HABECKER, Primary Examiner

M. M. CURTIS, Assistant Examiner

U.S. Cl. X.R.

178—17, 25; 340—324